United States Patent
Okuno et al.

(10) Patent No.: US 6,288,745 B1
(45) Date of Patent: Sep. 11, 2001

(54) SCANNER LINE INTERPOLATION DEVICE

(75) Inventors: Yoshiaki Okuno; Jun Someya; Hironobu Arimoto, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/170,123

(22) Filed: Oct. 13, 1998

(30) Foreign Application Priority Data

Apr. 24, 1997 (JP) .................................................... 9-105732

(51) Int. Cl.$^7$ ...................................................... H04N 7/01
(52) U.S. Cl. ........................ 348/448; 348/441; 348/452; 348/458; 348/459
(58) Field of Search .................................... 348/448, 441, 348/458, 459, 445, 451, 452, 449; H04N 7/01

(56) References Cited

U.S. PATENT DOCUMENTS

| | | | |
|---|---|---|---|
| 5,534,934 | * 7/1996 | Katsumata et al. | 348/445 |
| 5,550,936 | 8/1996 | Someya et al. | 382/263 |
| 5,796,437 | * 8/1998 | Muraji et al. | 348/452 |
| 5,838,381 | * 11/1998 | Kasahara et al. | 348/458 |
| 5,886,745 | * 3/1999 | Muraji et al. | 348/448 |

FOREIGN PATENT DOCUMENTS 5A-68240  3/1993  (JP) .

* cited by examiner

*Primary Examiner*—Reinhard J. Eisenzopf
*Assistant Examiner*—Jean W. Désir

(57) ABSTRACT

There is provided a scanning line interpolation device which is capable of providing an interpolated image with increased reproducibility of vertical high-frequency components in a still picture part. Preceding-field image data is stored in a field memory, and thereafter reference pixels which are located in an interpolation pixel position and its surrounding positions and required for interpolation are extracted from the preceding-field image data stored in the field memory and current-field image data. An inter-field motion judgement portion detects whether or not there is a motion of an image between preceding and current fields based on the extracted reference pixels. If the inter-field motion judgement portion detects that there is a motion, a selection circuit selects in-field interpolation data calculated in an in-field interpolation value calculation circuit from the current-field image data among the reference pixels. If the inter-field judgement portion detects that there is no motion, the selection circuit selects the preceding-field image data located in the interpolation pixel position among the reference pixels. Then, the selection circuit outputs the selected data as interpolation pixel image data.

15 Claims, 19 Drawing Sheets

FIG. 11

STILL PICTURE PATTERN TABLE

FIG. 17

INTERPOLATION TABLE

SCANNER LINE INTERPOLATION DEVICE

BACKGROUND OF THE INVENTION

1. Field of the Invention

The present invention relates to a scanning line interpolation device. More particularly, the invention relates to a scanning line interpolation device for converting an interlace signal into a non-interlace signal in image signal processing in a non-interlaced scanning CRT, a video printer, a matrix-type display device such as a plasma display, a liquid crystal display, an LED display, a field emission display, and a digital micromirror device, and the like.

2. Description of the Background Art

FIG. 15 shows a conventional scanning line interpolation device disclosed in Japanese Patent Application Laid-Open No. P05-68240A (1993). In FIG. 15, the reference numeral 101 designates a delay circuit for delaying input image data by a predetermined time interval; 102 designates a correlation judgement portion for judging the correlation between images; 103 designates a threshold value calculation circuit; 104 designates a binarization circuit; 105 designates an interpolation direction judgement circuit; 106 designates an interpolation calculation portion; 107 designates a selection circuit; 108 designates an adder; 109 designates a multiplier; the reference character Pi designates input image data; a, c, e, f, h and j designate reference pixel data extracted by the delay circuit 101 and required for interpolation; SH designates a threshold value; l, m, n, x, y and z designate results of binarization of the extracted pixels; IS designates interpolation direction selection data; PU and PD designate data selected for the interpolation; and Po designates an interpolation result.

The operation of the device shown in FIG. 15 will be described below. The two-dimensional image data Pi quantized using a predetermined sampling frequency is inputted to the delay circuit 101 which in turn extracts the reference pixels a, c, e, f, h and j. The reference pixels extracted by the delay circuit 101 are inputted to the threshold value calculation circuit 103, the binarization circuit 104, and the selection circuit 107. The threshold value calculation circuit 103 calculates the threshold value data SH to output the threshold value data SH to the binarization circuit 104. The binarization circuit 104 compares each of the reference pixels with the threshold value SH. If each of the reference pixels is not less than the threshold value, the binarization circuit 104 outputs "1." If each of the reference pixels is less than the threshold value, the binarization circuit 104 outputs "0." The binary data l, m, n, x, y and z corresponding respectively to the reference pixels a, c, e, f, h and j are inputted to the interpolation direction judgement circuit 105 for use as the addresses of an interpolation table in the interpolation direction judgement circuit 105. Then, the interpolation direction selection data IS is outputted from the interpolation direction judgement circuit 105. The selection circuit 107 selects one of vertical interpolation, right slant interpolation, and left slant interpolation, depending on the interpolation direction selection data IS. For the vertical interpolation, the selection circuit 107 selects the reference pixels c and h, and the adder 108 adds the reference pixels c and h together. Then, the multiplier 109 multiplies the sum of the reference pixels c and h by ½ to output the interpolation result Po. The selection circuit 107 selects the reference pixels e and f for the right slant interpolation, and selects the reference pixels a and j for the left slant interpolation.

For the interpolation of an uppermost or lowermost scanning line, the reference pixels in a single reference line are directly used for the interpolation or the reference pixels in the reference line which should be present on opposite side from the single reference line are set to "0".

FIG. 16 shows the relationship between an intended pixel Po located in an interpolation pixel position and the reference pixels. The circles of FIG. 16 denote the reference pixels, and the crosses denote interpolation pixels.

The interpolation table illustrated in FIG. 17 shows the relationship between the interpolation directions and the binary data l, m, n, x, y and z. The open circles "○" of FIG. 17 represent binary data "0"; the solid circles "•" represent binary data "1"; the vertical lines "|" represent the vertical interpolation; the slashes "/" represent the right slant interpolation; and the backslashes "\" represent the left slant interpolation.

The conventional scanning line interpolation device constructed as above described always performs a function as a vertical low pass filter upon the input image, thus deteriorating high-frequency components and providing only an interpolation image with fuzzy horizontal edges. Additionally, as a result of the interpolation of a corner part at which horizontal and vertical edges intersect, the corner part is rounded off since the slant interpolation is selected in accordance with the interpolation table. In particular, the interpolation performed on image data with sharp edges such as the image data of characters and graphics results in conspicuous edge fuzziness and significantly reduced interpolation image qualities.

FIG. 18 shows a result of the interpolation performed by the conventional scanning line interpolation device. For the interpolation of horizontal edges, the conventional scanning line interpolation device always selects the vertical interpolation to provide median values as the interpolation values. For the interpolation of corner parts, the conventional scanning line interpolation device always selects the slant interpolation to provide white data as the interpolation values. The values in the interpolation line after the interpolation completely differ from those before the interpolation. In visual terms, the resultant image has fuzzy horizontal edges and rounded corners.

For example, image data "T" (ID1) as shown in FIG. 19A is contemplated which is comprised of first- and second-field image data ID2 and ID3 shown in FIGS. 19B and 19C, respectively. With such a configuration, when in-field interpolation is performed upon the first-field image data, interpolated image data ID4 has a joint part of "T" which is rounded off by means of an interpolation table t1 and a stem end to which white data is provided by means of an interpolation table t2, as shown in FIG. 19B. Likewise, the in-field interpolation performed upon the second-field image data designated by ID3 of FIG. 19C provides interpolated image data ID5.

SUMMARY OF THE INVENTION

A first aspect of the present invention is intended for a scanning line interpolation device for converting an interlace signal into a non-interlace signal. According to the present invention, the scanning line interpolation device comprises: storage means for storing preceding-field image data; reference pixel data extraction means for extracting a plurality of reference pixel data from current-field image data and the preceding-field image data provided from the storage means, the plurality of reference pixel data including pixel data located in an interpolation pixel position which is not present in the current-field image data and in positions surrounding the interpolation pixel position; inter-field motion detection means for detecting whether or not there is a motion of an image between a preceding field and a current field, based on the plurality of reference pixel data; in-field interpolation data calculation means for calculating in-field interpolation data associated with the interpolation pixel position based on pixel data in the current field among the plurality of reference pixel data; and interpolation pixel selection means operative to select the in-field interpolation data when the inter-field motion detection means detects that there is a motion, and to select pixel data in the preceding-field image data which is located in the interpolation pixel position when the inter-field motion detection means detects that there is no motion, thereby to output the selected data as interpolation pixel data of a pixel located in the interpolation pixel position.

Preferably, according to a second aspect of the present invention, in the scanning line interpolation device of the first aspect, the plurality of reference pixel data comprise central line pixel data which are pixel data derived from the preceding-field image data and positioned on a central line on which the interpolation pixel position is present, and upper and lower line pixel data which are pixel data derived from the current-field image data and positioned on upper and lower lines lying above and below the central line, and the inter-field motion detection means comprises: vertical correlation data calculation means for calculating vertical correlation data indicative of a vertical line correlation which is a pixel data correlation between the upper line data, the central line data and the lower line data; and motion detection means for detecting whether or not there is a motion of the image based on the vertical correlation data.

Preferably, according to a third aspect of the present invention, in the scanning line interpolation device of the first aspect, the inter-field motion detection means comprises: threshold-by-threshold binarization means for weighting each of the plurality of reference pixel data to binarize each of the plurality of reference pixel data using the average value of the plurality of weighted reference pixel data as a threshold value; and motion detection means for comparing the plurality of binarized reference pixel data with a predetermined binary data pattern to detect a motion of the image based on a result of the comparison.

Preferably, according to a fourth aspect of the present invention, in the scanning line interpolation device of the first aspect, the plurality of reference pixel data include a first number of reference pixel data, and the reference pixel data extraction means comprises: reference pixel data preliminary extraction means for preliminarily extracting a second number of reference pixel data from the current-field image data and the preceding-field image data provided from the storage means, the second number being greater than the first number of the pixel data located in the interpolation pixel position and in the positions surrounding the interpolation pixel position; and reference pixel data selection means for selecting the first number of reference pixel data to be actually extracted from the second number of reference pixel data.

The scanning line interpolation device in accordance with the first aspect of the present invention comprises the interpolation pixel selection means operative to select the in-field interpolation data when the inter-field motion detection means detects that there is a motion, and to select the pixel data in the preceding-field image data located in the interpolation pixel position when the inter-field motion detection means detects that there is no motion, thereby to output the selected data as the interpolation pixel data of the pixel located in the interpolation pixel position. This enhances the reproducibility of vertical high-frequency components in a still picture part of an image to reduce fuzziness at edges.

Further, the inter-field motion detection means may detect whether or not there is a motion by using the preceding-field image data and the current-field image data as the reference pixel data required for motion detection, thereby to detect the motion between the fields.

The vertical correlation data calculation means in the scanning line interpolation device in accordance with the second aspect of the present invention calculates the vertical correlation data indicative of the vertical line correlation which is the pixel data correlation between the upper line data, the central line data and the lower line data, thereby to achieve the motion detection sensitive to even a small amount of horizontal image movement.

The motion detection means in the scanning line interpolation device in accordance with the third aspect of the present invention compares the plurality of binarized reference pixel data with the predetermined binary data pattern to detect the motion of the image based on the result of the comparison, thereby achieving the motion detection in accordance with the predetermined binary pattern.

Furthermore, the reference pixel data selection means in the scanning line interpolation device in accordance with the fourth aspect of the present invention selects the first number of reference pixel data (< the second number) to be actually extracted from the second number of reference pixel data. Therefore, the reference pixel data selection means may select the first number of reference pixel data to be actually extracted from the second number of reference pixel data based on the bands of the preceding- and current-field image data serving as the input image data, to allow the inter-field motion detection means in the next stage to perform the motion detection.

It is therefore an object of the present invention to provide a scanning line interpolation device which is capable of enhancing the reproducibility of vertical high-frequency components in a still picture part of an image to provide an interpolated image which is much less fuzzy at natural image edges, character and graphic edges and corners.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows an example of a still picture pattern table of a still picture pattern judgement circuit shown in FIG. 8;

Figure 17:
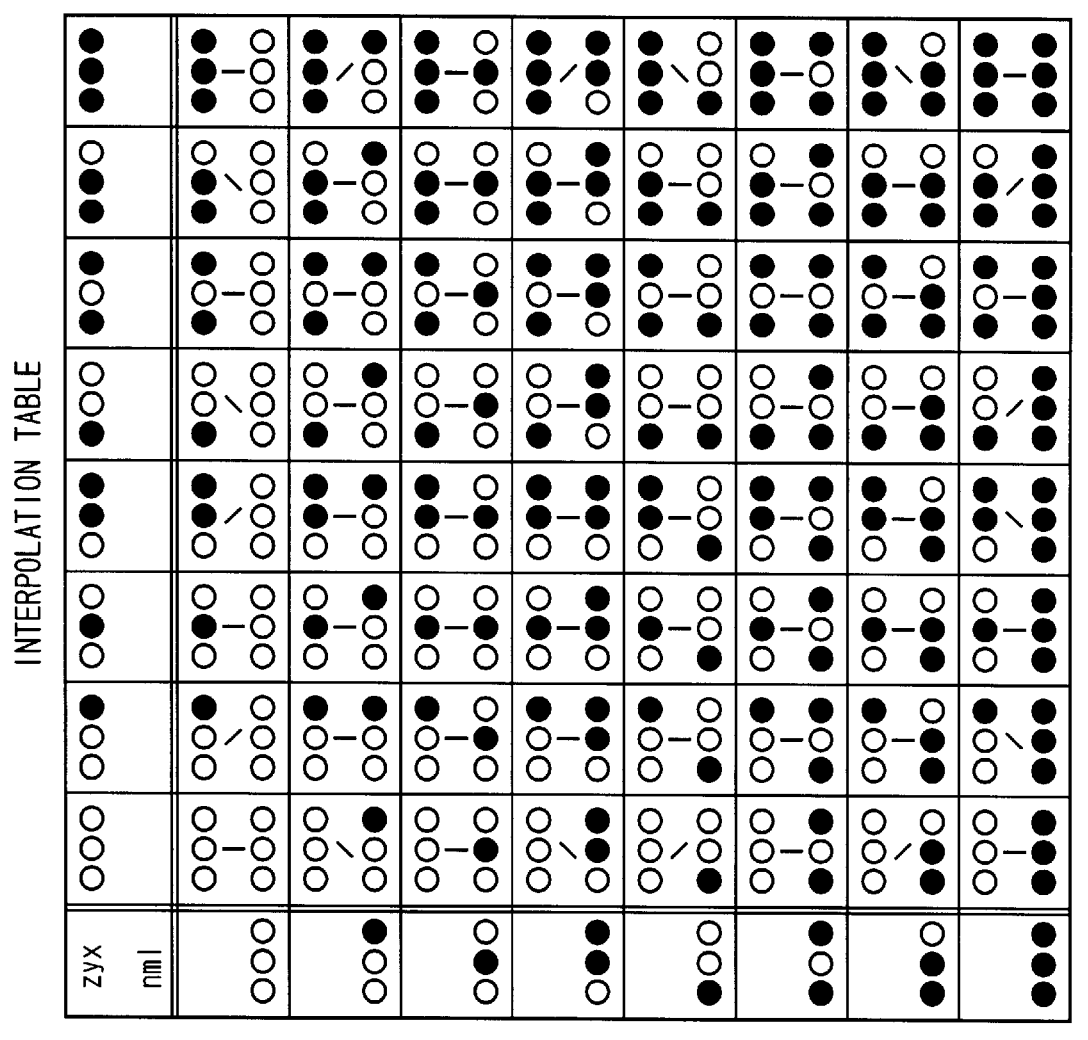

FIG. 17 shows an example of an interpolation table of an interpolation direction judgement circuit shown in FIGS. 5 and 12;

DESCRIPTION OF THE PREFERRED EMBODIMENTS

According to preferred embodiments of the present invention, a scanning line interpolation device performs motion detection using reference pixel data extracted from two consecutive fields of image data to carry out scanning line interpolation processing based on the result of the motion detection, thereby providing a satisfactory interpolation result having enhanced reproducibility of vertical high-frequency components in a still picture part of an image.

Further, the scanning line interpolation device according to the present invention detects a motion in the two consecutive fields of image data depending on whether or not there is a vertical correlation between a reference pixel in a central line and reference pixels in upper and lower lines. Therefore, the scanning line interpolation device is operative to perform the motion detection sensitive to even a small amount of image movement.

Furthermore, the scanning line interpolation device according to the present invention performs the motion detection based on the result of comparison between the binary data of the reference pixels and a specific binary pattern. Thus, the scanning line interpolation device is operative to detect that a desired still picture pattern is not in motion.

The preferred embodiments according to the present invention will now be described with reference to the drawings.

First Preferred Embodiment

Figure 1:
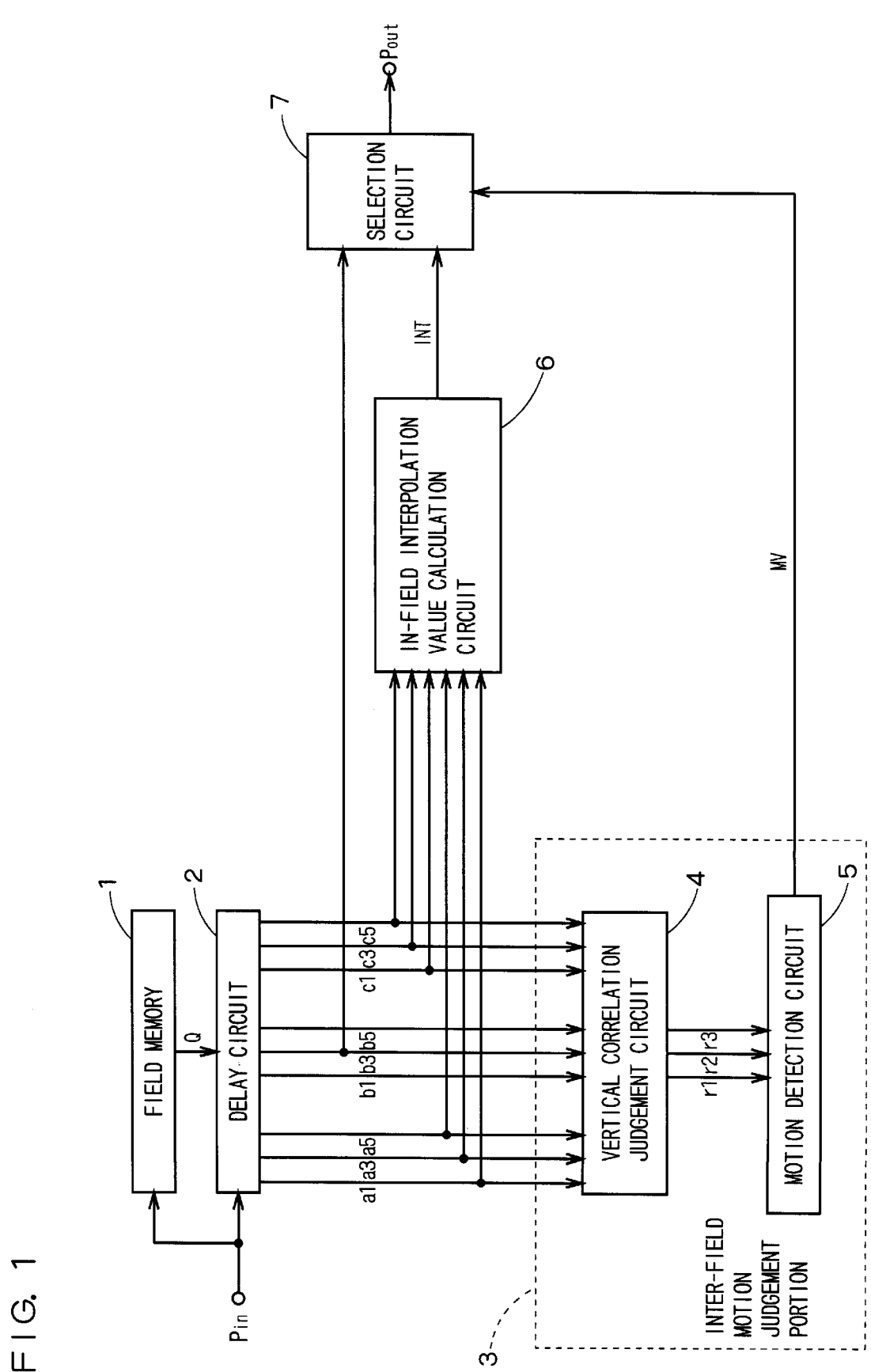
FIG. 1 shows the construction of a scanning line interpolation device according to a first preferred embodiment of the present invention.

FIG. 1 shows a scanning line interpolation device according to a first preferred embodiment of the present invention. In FIG. 1, the reference numeral 1 designates a field memory; 2 designates a delay circuit; 3 designates an inter-field motion judgement portion; 4 designates a vertical correlation judgement circuit; 5 designates a motion detection circuit; 6 designates an in-field interpolation value calculation circuit; 7 designates a selection circuit; the reference character Pin designates input image data; a1, a3, a5, b1, b3, b5, c1, c3 and c5 designate reference pixel data extracted by the delay circuit 2 and required for interpolation; r1, r2 and r3 designate vertical correlation judgement results; MV designates motion detection data; INT designates in-field interpolation value data; and Pout designates an interpolation result.

Figure 2:
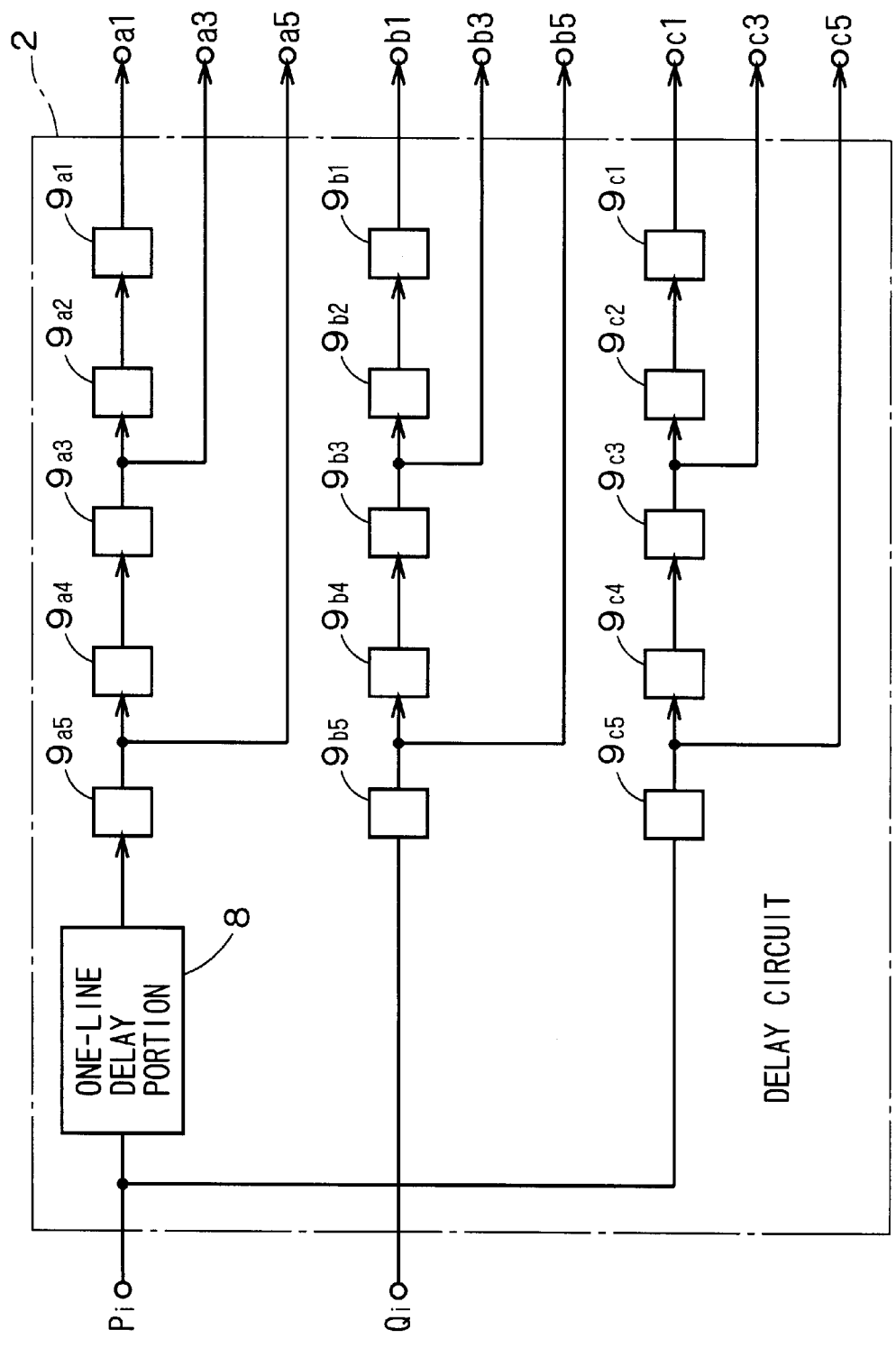
FIG. 2 shows an arrangement of a delay circuit shown in FIGS. 1 and 8.

FIG. 2 shows a detailed arrangement of the delay circuit 2. In FIG. 2, the reference numeral 8 designates a one-line delay portion; and the reference characters 9a1, 9a2, 9a3, 9a4, 9a5, 9b1, 9b2, 9b3, 9a4, 9b5, 9c1, 9c2, 9c3, 9c4 and 9c5 designate registers each comprised of a one-pixel delay element.

Figure 3:
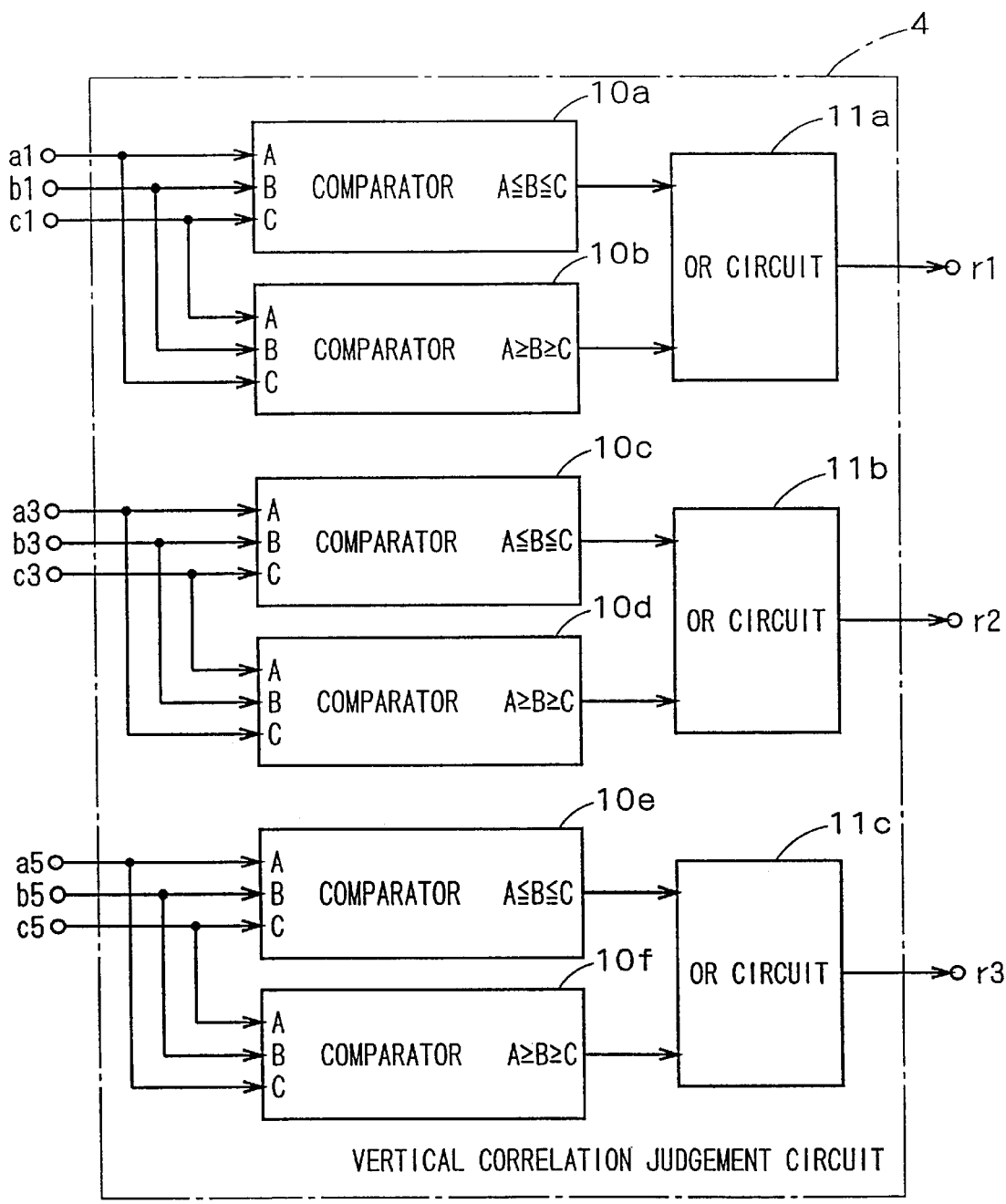
FIG. 3 shows an arrangement of a vertical correlation judgement circuit shown in FIGS. 1 and 12.

FIG. 3 shows a detailed arrangement of the vertical correlation judgement circuit 4. In FIG. 3, the reference characters 10a, 10b, 10c, 10d, 10e and 10f designate comparators; and 11a, 11b and 11c designate OR circuits.

Figure 4:
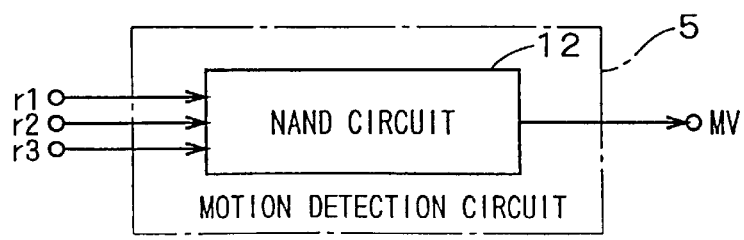
FIG. 4 shows an arrangement of a motion detection circuit shown in FIGS. 1 and 12.

FIG. 4 shows an arrangement of the motion detection circuit 5. In FIG. 4, the reference numeral 12 designates a NAND circuit.

Figure 5:
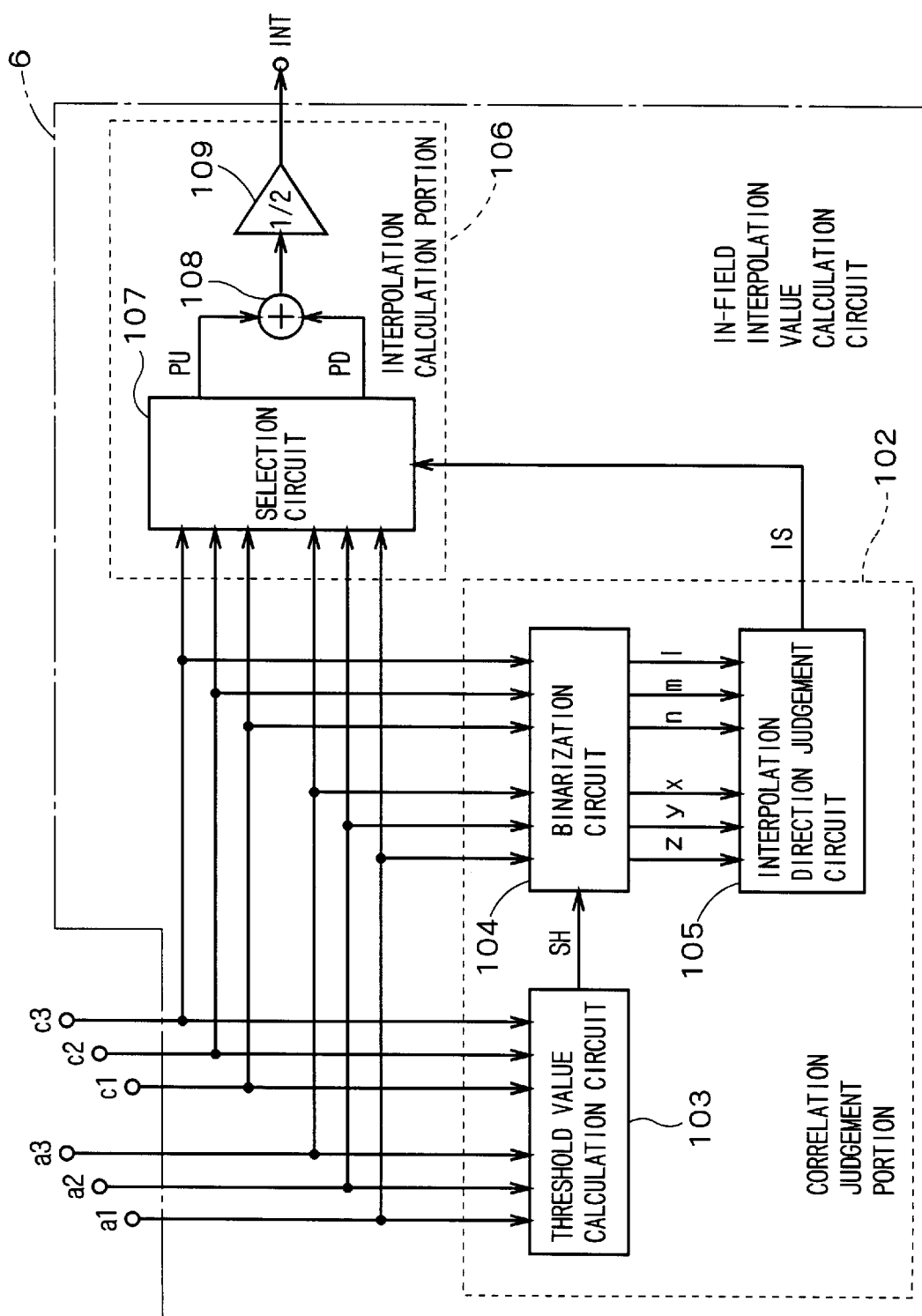
FIG. 5 shows an arrangement of an in-field interpolation value calculation circuit shown in FIGS. 1, 8 and 12.

FIG. 5 shows an arrangement of the in-field interpolation value calculation circuit 6. In FIG. 5, the reference characters l, m, n, x, y and z designate results of binarization of the extracted reference pixels.

Figure 6:
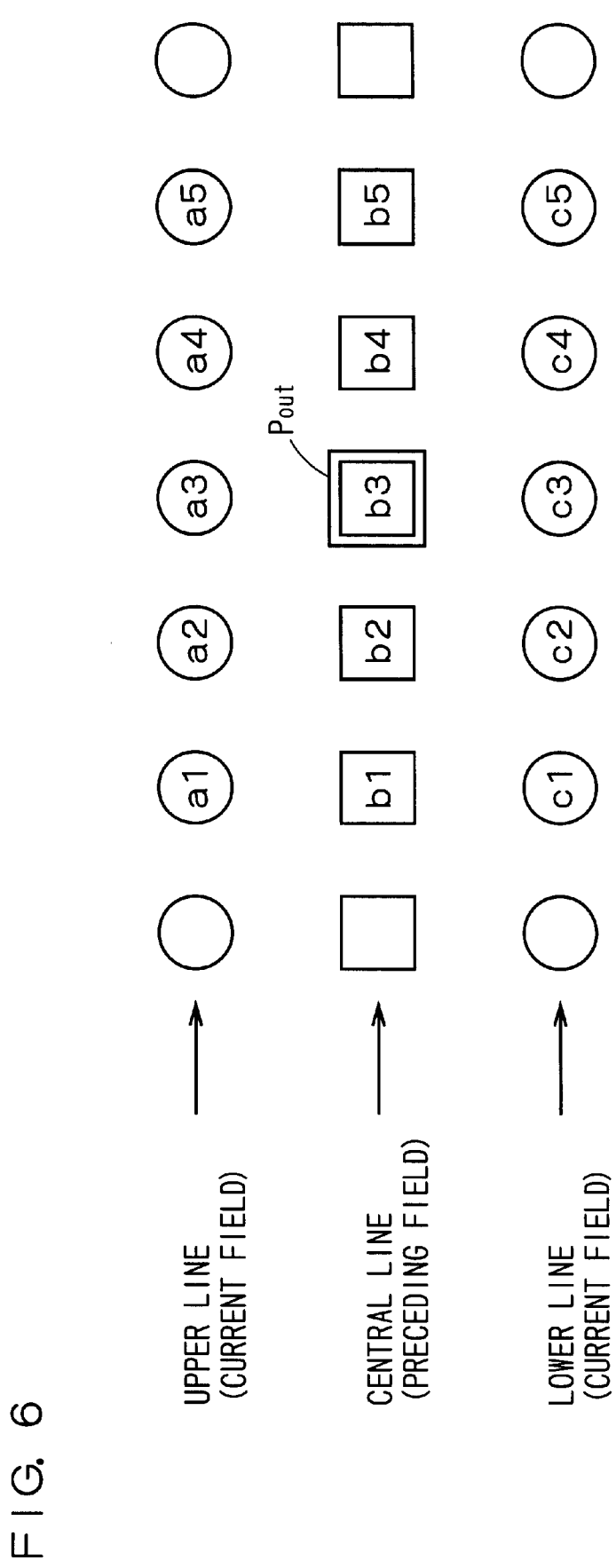
FIG. 6 shows the relationship between an intended pixel and reference pixels according to the present invention.

FIG. 6 shows the relationship between an intended pixel Pout which is present in an interpolation pixel position and the reference pixels. The circles of FIG. 6 denote current-field image data, and the squares denote preceding-field image data.

In operation, the two-dimensional image data Pin quantized using a predetermined sampling frequency is inputted to the field memory 1 and the delay circuit 2. The field image data Pin inputted to the field memory 1 is delayed by a one-field time interval and then inputted to the delay circuit 2 as preceding-field image data Q. The one-line delay portion 8 and registers 9a1 to 9a5, 9b1 to 9b5, and 9c1 to 9c5 shown in FIG. 2 delay the current-field image data Pin and preceding-field image data Q inputted to the delay circuit 2 by predetermined time intervals, to output the extracted reference pixel data a1, a3, a5 (upper line pixel data), b1, b3, b5 (central line pixel data), and c1, c3, c5 (lower line pixel data).

All of the reference pixels extracted by the delay circuit 2 are inputted to the vertical correlation judgement circuit 4. The reference pixel data a1, a3, a5, c1, c3 and c5 are also inputted to the in-field interpolation value calculation circuit 6. The reference pixel data b3 present in the interpolation pixel position is also inputted to the selection circuit 7. The comparators 10a to 10f in the vertical correlation judgement circuit 4 compare three pixels aj, bj and cj (j=1, 3, 5 herein) which are adjacent to each other in the vertical direction. If the three vertically adjacent pixels aj, bj an cj among the reference pixels satisfy either $aj \leq bj \leq cj$ or $aj \geq bj \geq cj$, the vertical correlation judgement circuit 4 judges that there is a vertical correlation between the three pixels aj, bj and cj. For example, the comparators 10a, 10c and 10e shown in FIG. 3 output "1" if the relationship $aj \leq bj \geq cj$ is satisfied, and the comparators 10b, 10d and 10f output "1" if the relationship $aj \geq bj \geq cj$ is satisfied. The comparison results from the comparators 10a and 10b are inputted to the OR circuit 11a. The comparison results from the comparators 10c and 10d are inputted to the OR circuit 11b. The comparison results from the comparators 10e and 10f are inputted to the OR circuit 11c.

The OR circuit 11a of FIG. 3 outputs the vertical correlation judgement data r1 = "1" when at least one of the comparison results from the comparators 10a and 10b is "1." The OR circuits 11b and 11c perform similar operations to output the vertical correlation judgement data r2 and r3. The vertical correlation judgement data r1, r2 and r3 are inputted to the motion detection circuit 5. If all of the vertical correlation judgement data r1, r2 and r3 are "1," the motion detection circuit 5 outputs the motion detection data MV="0" and detects that there is no motion based on the reference pixels. On the other hand, if at least one of the vertical correlation judgement data r1, r2 and r3 is "0," the motion detection circuit 5 outputs the motion detection data MV="1" and detects that there is a motion based on the reference pixels.

Figure 15:
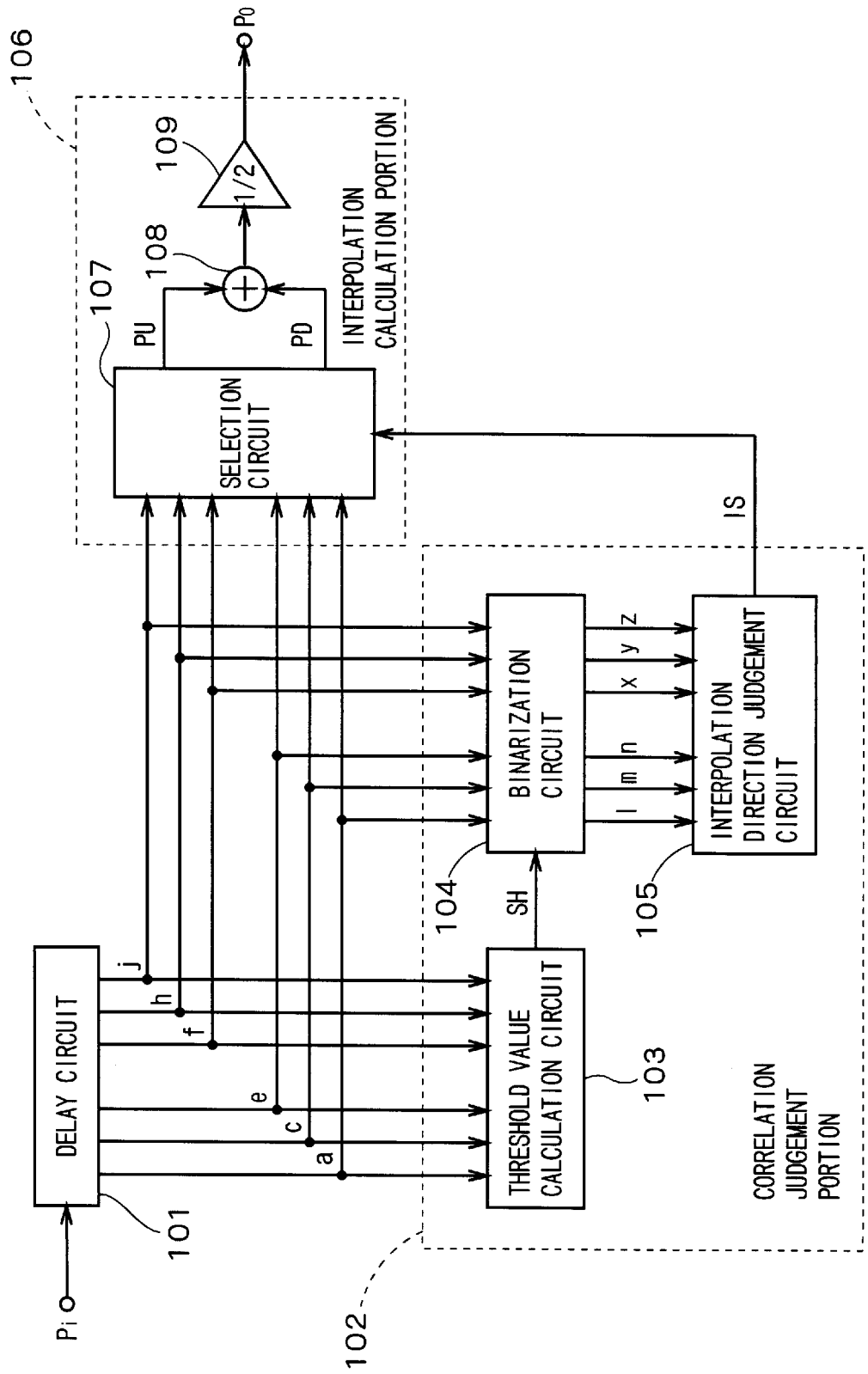
FIG. 15 shows a conventional scanning line interpolation device.
Figure 16:
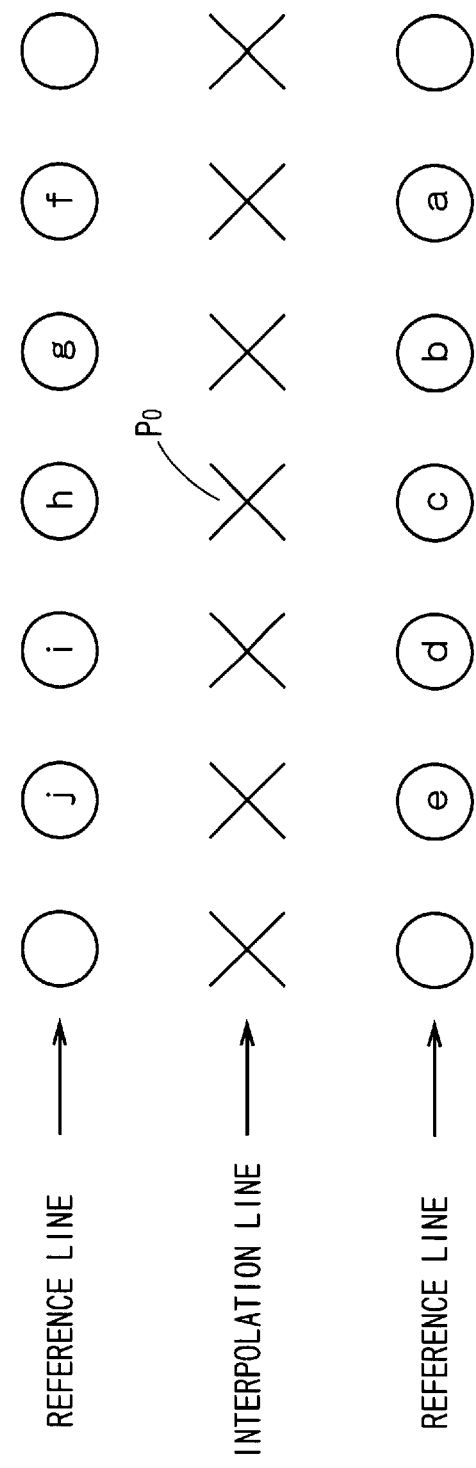
FIG. 16 shows the relationship between an intended pixel and reference pixels in the conventional scanning line interpolation device.
Figure 18:
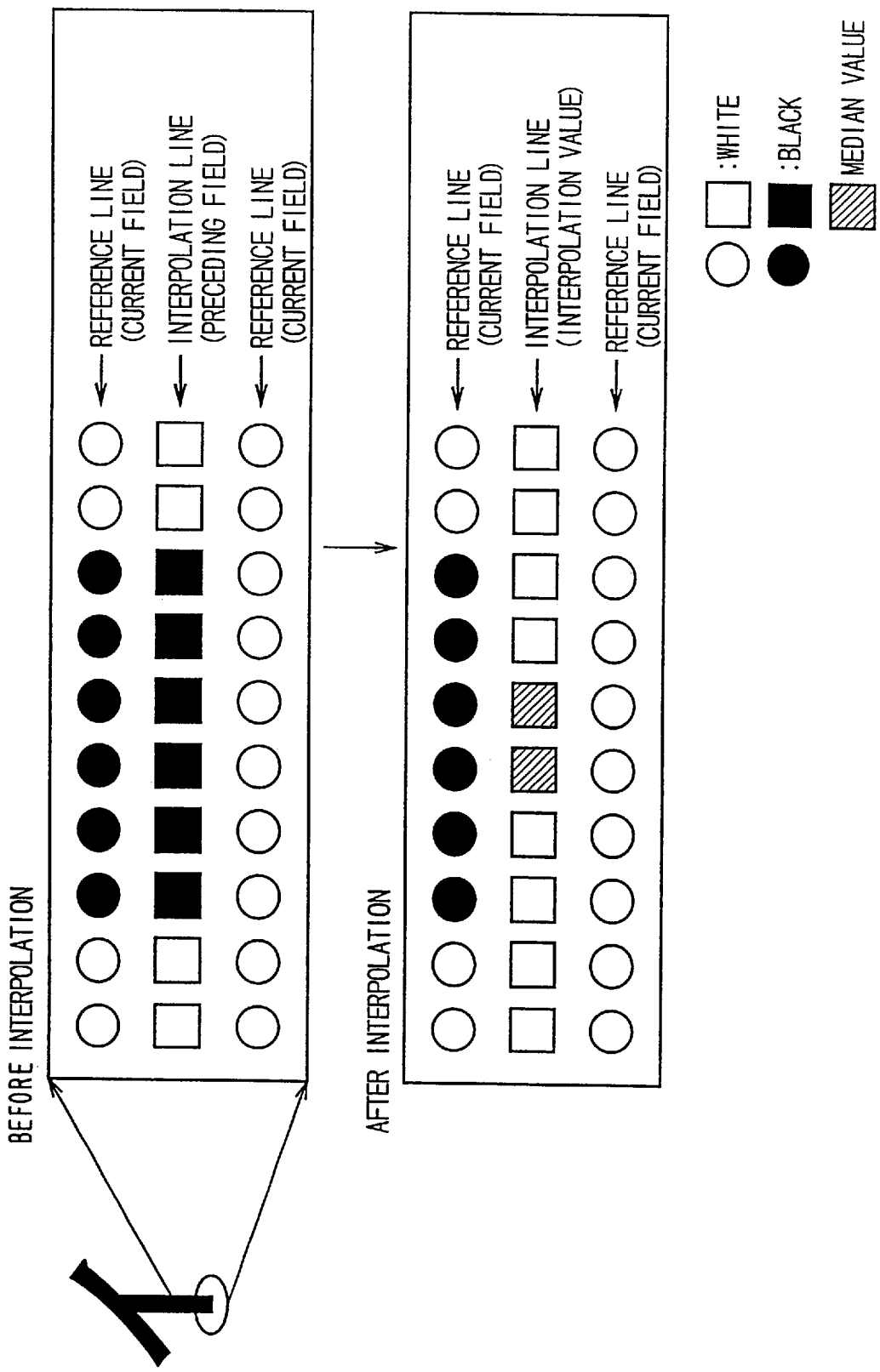
FIG. 18 shows a scanning line interpolation result in the conventional scanning line interpolation device.
Figure 19A:
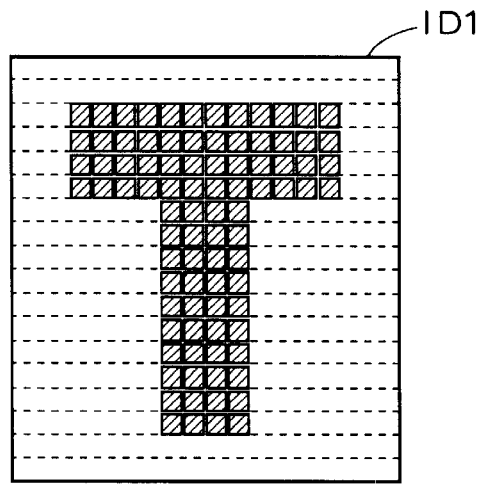
FIGS. 19A, 19B, and 19C show a scanning line interpolation result in the conventional scanning line interpolation device.
Figure 19B:
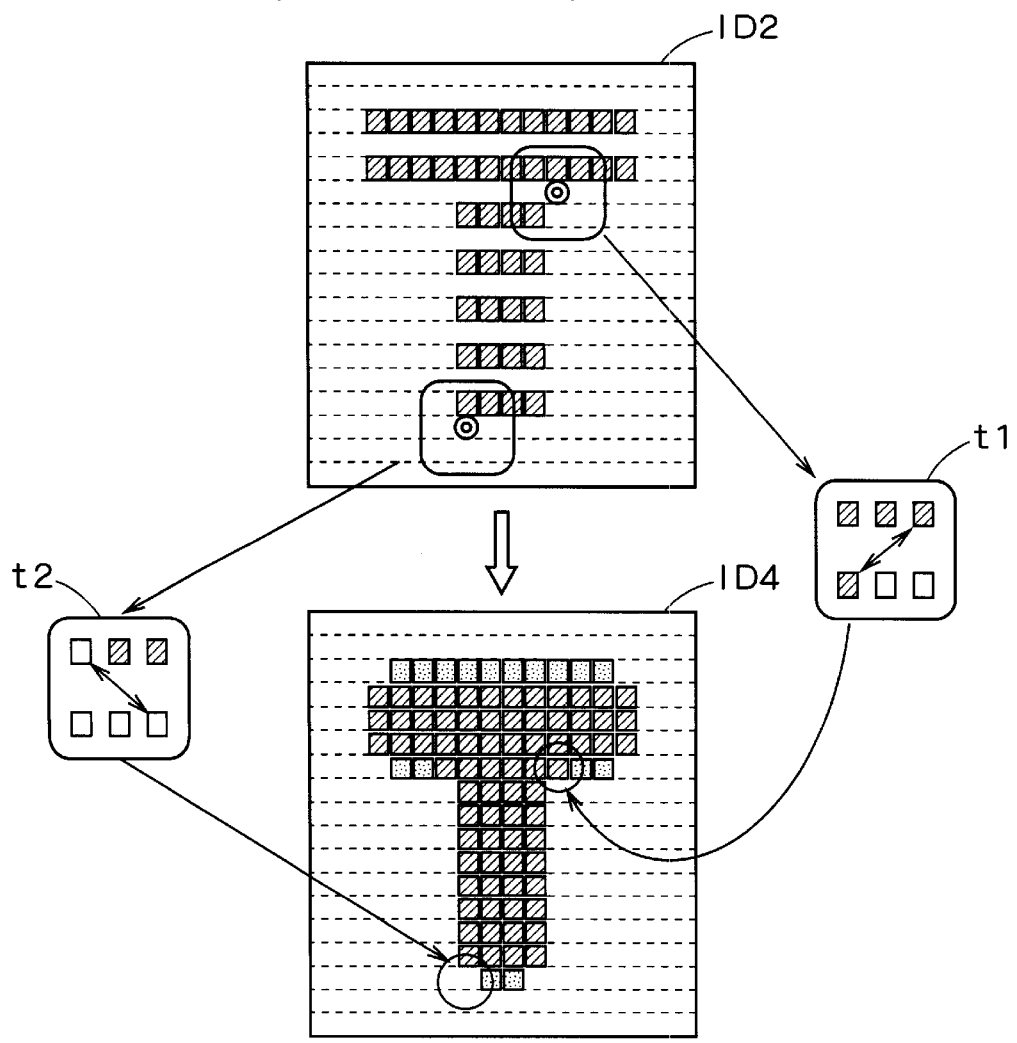
Figure 19C:
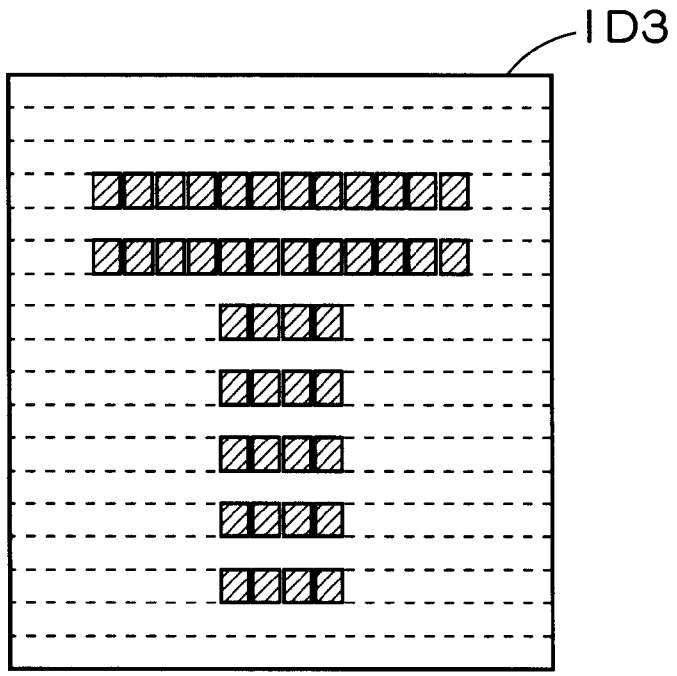
Figure 19C:
Figure 19C:
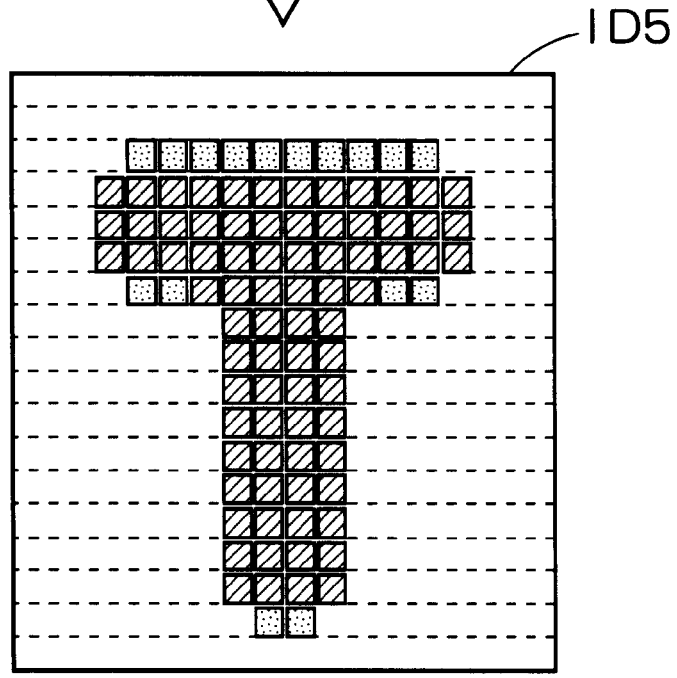

The background art scanning line interpolation circuit described with reference to FIG. 15 is applied to the in-field interpolation value calculation circuit 6. The in-field interpolation value calculation circuit 6 is provided by eliminating the delay circuit 101 for extracting the reference pixels in the scanning line interpolation circuit shown in FIG. 15. The reference pixels a1, a3, a5, c1, c3 and c5 are inputted to a threshold value calculation circuit 103, a binarization circuit 104, and a selection circuit 107 shown in FIG. 5. The threshold value calculation circuit 103 calculates threshold value data SH to output the threshold value data SH to the binarization circuit 104. The binarization circuit 104 compares each of the reference pixels with the threshold value SH. If each of the reference pixels is not less than the threshold value SH, the binarization circuit 104 outputs "1." If each of the reference pixels is less than the threshold value SH, the binarization circuit 104 outputs "0." The binary data z, y, x, n, m, 1 corresponding respectively to the reference pixels a1, a3, a5, c1, c3 and c5 are inputted to an interpolation direction judgement circuit 105 for use as the addresses of an interpolation table in the interpolation direction judgement circuit 105. Then, interpolation direction selection data IS is outputted from the interpolation direction judgement circuit 105. The selection circuit 107 selects one of vertical interpolation, right slant interpolation, and left slant interpolation, depending on the interpolation direction selection data IS. For the vertical interpolation, the selection circuit 107 selects the reference pixels a3 and c3, and an adder 108 adds the reference pixels a3 and c3 together. Then, a multiplier 109 multiplies the sum of the reference pixels a3 and c3 by ½ to output the in-field interpolation value INT. The selection circuit 107 selects the reference pixels a5 and c1 for the right slant interpolation, and selects the reference pixels a1 and c5 for the left slant interpolation.

The motion detection data MV, the reference pixel data b3 present in the interpolation pixel position which is the preceding-field image data, and the in-field interpolation value INT are inputted to the selection circuit 7. The selection circuit 7 selects one of the reference pixel data b3 and the in-field interpolation value INT depending on the motion detection data MV. Specifically, the selection circuit 7 selects the reference pixel data b3 if the motion detection circuit 5 detects that there is no motion (MV ="0"), and selects the in-field interpolation value INT if the motion detection circuit 5 detects that there is a motion (MV="1"). Then, the selection circuit 7 outputs the selected data or value as the interpolation result Pout.

Figure 7:
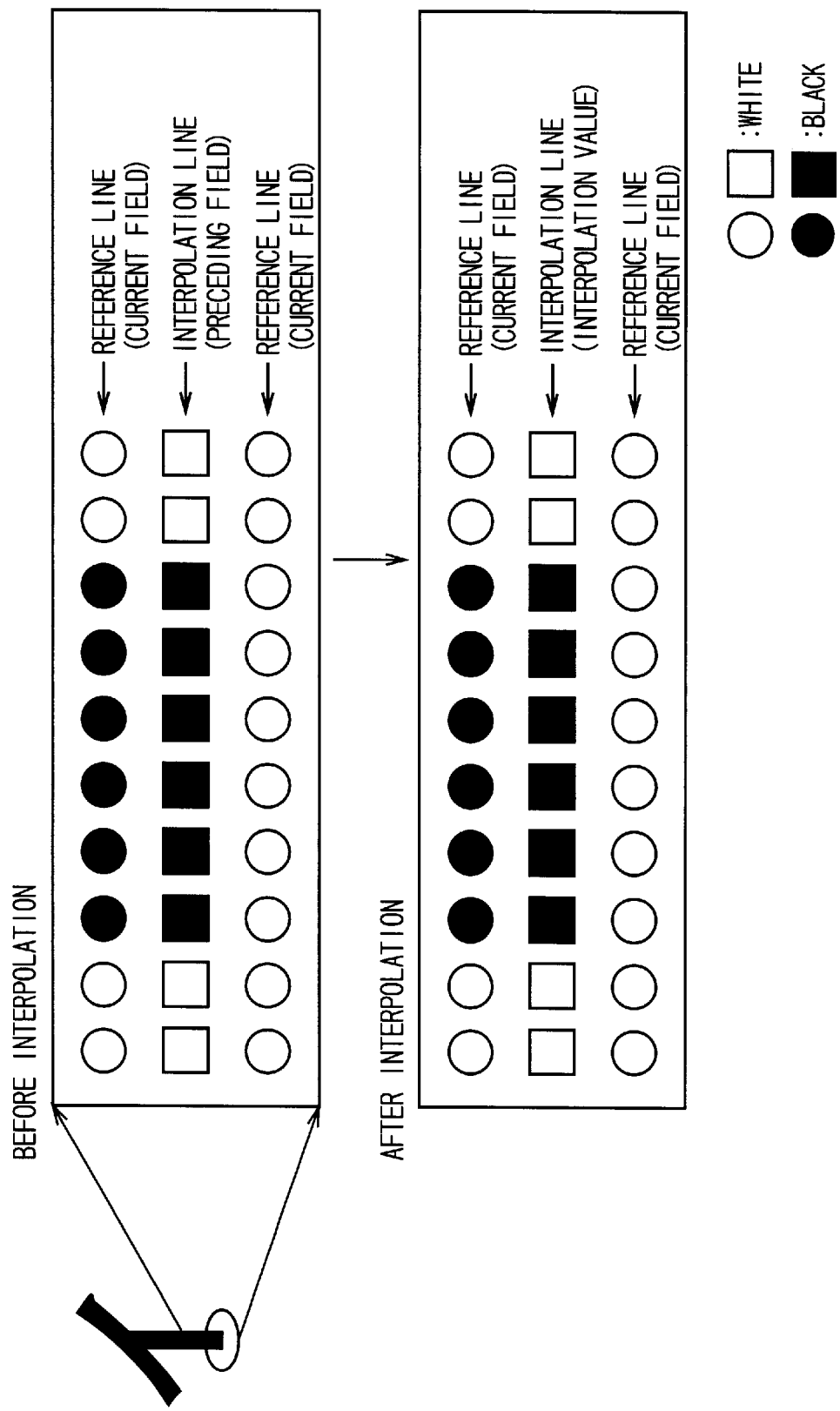
FIG. 7 shows a scanning line interpolation result according to the present invention.

In accordance with the first preferred embodiment, the motion of the image in the interpolation pixel position is detected. If the result of the detection is that there is no motion, the preceding-field image data present in the interpolation pixel position is used as the interpolation value. This enhances the reproducibility of the vertical high-frequency components in a still picture part of the image. In particular, the interpolation performed upon image data with sharp edges such as the image data of characters and graphics may reduce the fuzziness not only at horizontal edges but also at edges of corner parts at which horizontal and vertical edges intersect, thereby enhancing visibility. FIG. 7 shows a result of the interpolation performed by the scanning line interpolation device of the first preferred embodiment.

Additionally, since the inter-field motion judgement portion 3 makes the judgement based on the correlation judgement data of the reference pixels arranged in the vertical direction of the image, the motion detection is sensitive to even a small amount of horizontal image movement.

Furthermore, the inter-field motion judgement portion 3 judges that there is a vertical correlation if the three vertically adjacent pixels aj, bj and cj satisfy either $aj \leq bj \leq cj$ or $aj \geq bj \geq cj$. This allows satisfactory image motion detection in gradation image parts wherein gradation levels change gradually as well as in the edge parts wherein the image within the range of the reference pixels is sharp.

Furthermore, the in-field motion judgement portion 3 makes the vertical correlation judgement not only in the interpolation pixel position (j=3 herein) but also in pixel positions adjacent to the left and right thereof (j=1 and 5 herein), reducing motion detection failures. In particular, an image wherein there is a motion is prevented from being detected by mistake that there is no motion.

Moreover, the delay circuit 2 extracts the reference pixels in such a manner that the reference pixels required by the background art scanning line interpolation device, which is corresponding to the in-field interpolation value calculation circuit 6 herein, and the reference pixels required for the motion detection are used in common. Thus, when the same input image band is given, both the in-field interpolation value and the motion detection provide satisfactory results. Specifically, the first preferred embodiment may provide the in-field interpolation value precisely responsive to the input image band and the motion detection just enough sensitive to the input image band.

Second Preferred Embodiment

Figure 8:
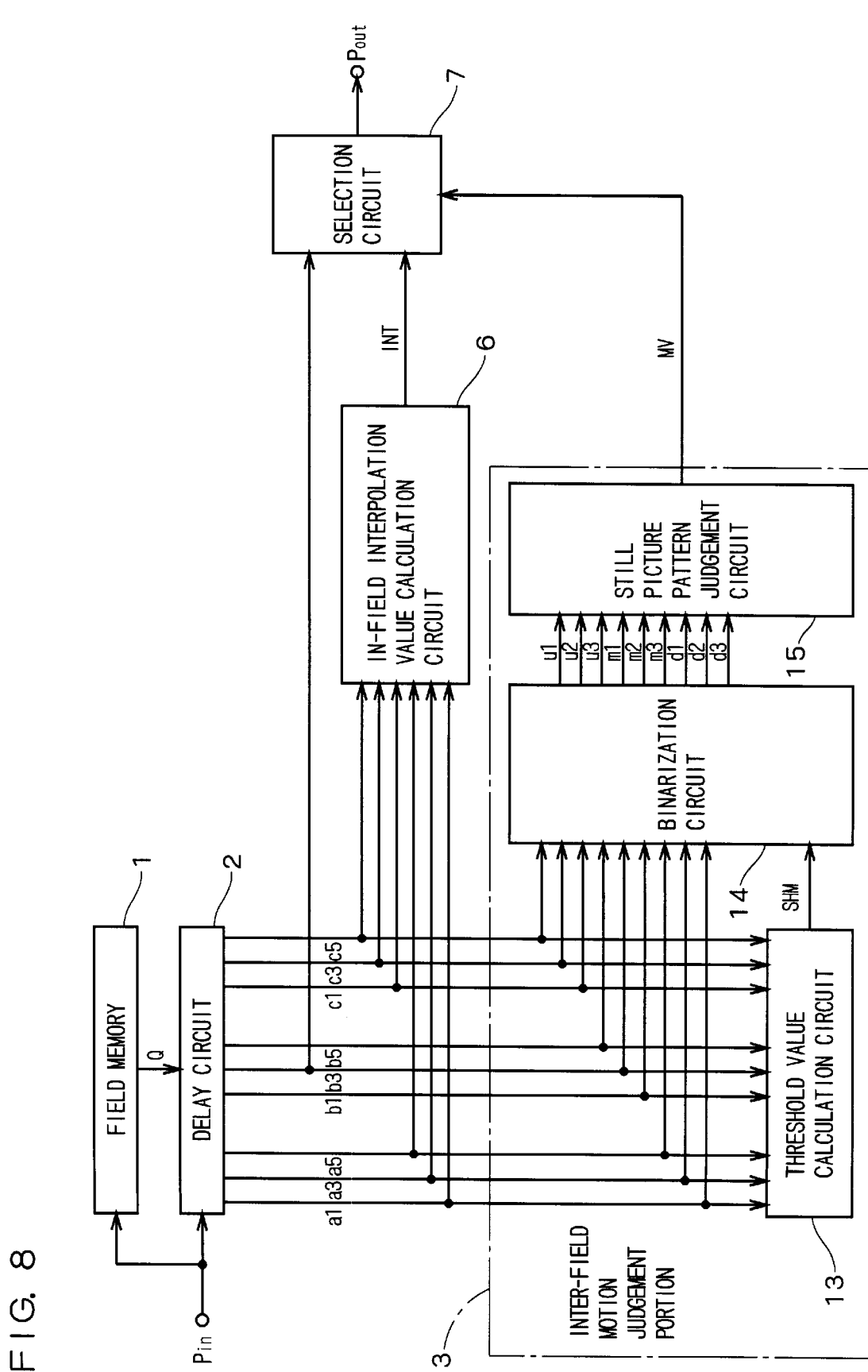
FIG. 8 shows the construction of the scanning line interpolation device according to a second preferred embodiment of the present invention.

FIG. 8 shows the scanning line interpolation device according to a second preferred embodiment of the present invention. Like reference characters are used in FIG. 8 to designate parts identical with or corresponding to those of FIG. 1. The reference numeral 13 designates a threshold value calculation circuit; 14 designates a binarization circuit; 15 designates a still picture pattern judgement circuit; the reference character SHM designates threshold value data; and u1, u2, u3, m1, m2, m3, d1, d2 and d3 designate binary data.

Figure 9:
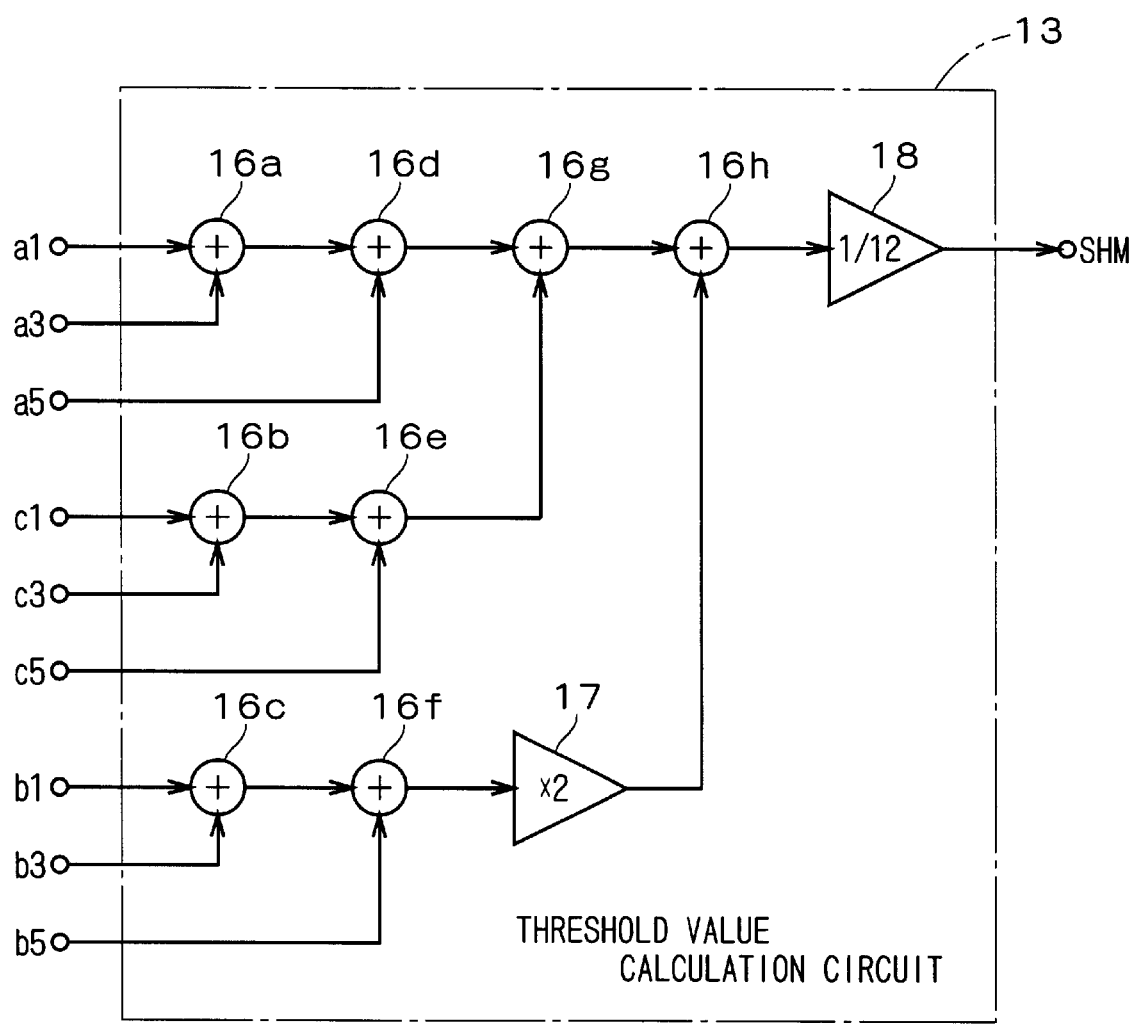
FIG. 9 shows an arrangement of a threshold value calculation circuit shown in FIG. 8.

FIG. 9 shows an arrangement of the threshold value calculation circuit 13. In FIG. 9, the reference characters 16a to 16h designate adders; and 17 and 18 designate multipliers.

Figure 10:
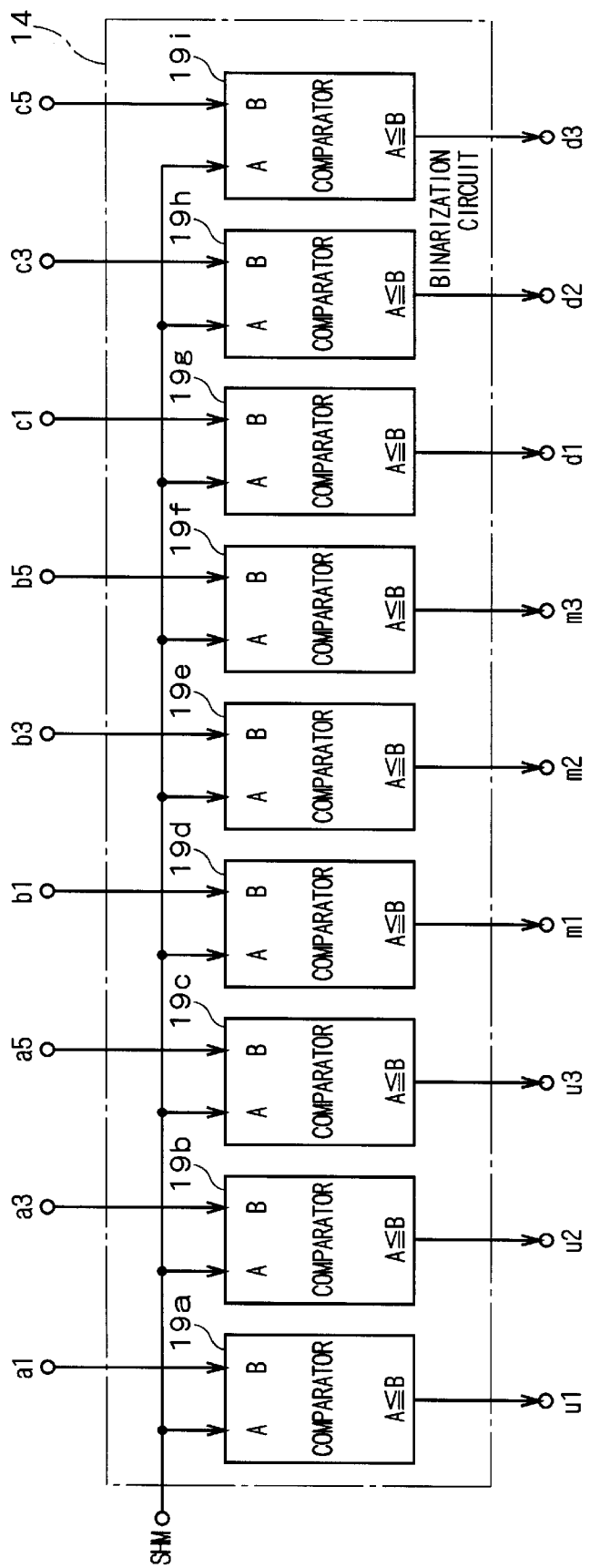
FIG. 10 shows an arrangement of a binarization circuit shown in FIG. 8.

FIG. 10 shows an arrangement of the binarization circuit 14. In FIG. 10, the reference characters 19a to 19i designate comparators.

Figure 11:
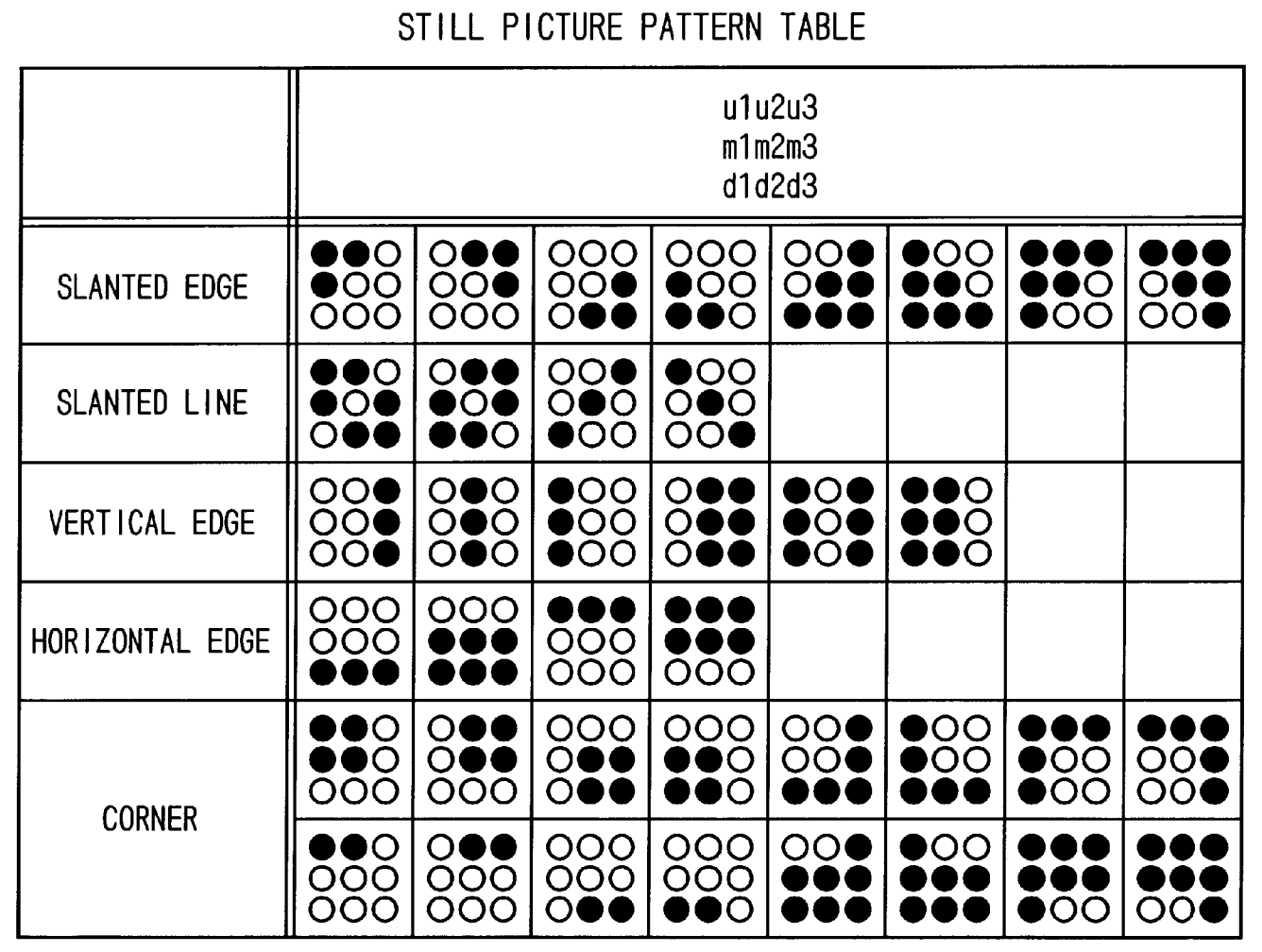

FIG. 11 shows an example of a still picture pattern table in the still picture pattern judgement circuit 15.

In operation, the quantized two-dimensional image data pin is inputted to the field memory 1 and the delay circuit 2. The field image data pin inputted to the field memory 1 is delayed by a one-field time interval and then inputted to the delay circuit 2 as the preceding-field image data Q. The one-line delay portion 8 and registers 9a1 to 9a5, 9b1 to 9b5, and 9c1 to 9c5 shown in FIG. 2 delay the current-field image data Pin and preceding-field image data Q inputted to the delay circuit 2 by predetermined time intervals, to output the reference pixel data a1, a3, a5, b1, b3, b5, c1, c3 and c5. All of the reference pixels extracted in the delay circuit 2 are inputted to the threshold value calculation circuit 13 and the binarization circuit 14. The reference pixels al, a3, as, c1, c3 and c5 are also inputted to the in-field interpolation value calculation circuit 6. The preceding-field image data b3 present in the interpolation pixel position is also inputted to the selection circuit 7.

In the threshold value calculation circuit 13, the adders 16a to 16h add together the reference pixels a1, a3, a5, c1, c3, c5 and the reference pixels or central line data b1, b3 and b5 weighted twofold by the multiplier 17. The multiplier 18 multiplies the sum outputted from the adder 16h by $\frac{1}{12}$ to provide a weighted average value of the reference pixels. In this manner, the threshold value calculation circuit 13 of FIG. 8 outputs the threshold value data SHM determined by $$SHM = \{(a1+a3+as+c1+c3+c5)+2\cdot(b1+b3+b5)\}/12$$

The threshold value data SHM is inputted to the binarization circuit 14. The comparators 19a to 19i in the binarization circuit 14 compare the reference pixels with the threshold value SHM. Each of the comparators 19a to 19i outputs "1" when the reference pixel inputted thereto is not less than the threshold value SHM.

The comparator 19a shown in FIG. 10 compares the reference pixel a1 with the threshold value SHM. The comparator 19a outputs the comparison result u1="1" if a1 ≧ SHM, and outputs the comparison result u1="0" if a1<SHM. The comparators 19b, 19c, 19d, 19e, 19f, 19g, 19h and 19i are similar in operation to the comparator 19a. The binary data u1, u2, u3, m1, m2, m3, d1, d2 and d3 are inputted to the still picture pattern judgement circuit 15. If there is a match between one of the patterns contained in the still picture pattern table shown in FIG. 11 and the binary data u1, u2, u3, m1, m2, m3, d1, d2 and d3, the still picture pattern judgement circuit 15 detects that there is no motion based on the reference pixels to output the motion detection data MV="0." If there is no match therebetween, the still picture pattern judgement circuit 15 detects that there is a motion to output the motion detection data MV="1." Other operations of the second preferred embodiment are similar to those of the first preferred embodiment, and the description thereof will be omitted herein.

The second preferred embodiment uses the result of the comparison between the reference pixel binary data and the still picture pattern table, thereby to set still picture part patterns intended to be detected in detail. For example, setting corner patterns as shown in the still picture pattern table of FIG. 11 may successfully reproduce the edges of characters and graphics adjacent corners in the still picture part of the image. This accomplishes an interpolated image with high visibility.

Third Preferred Embodiment

Figure 12:
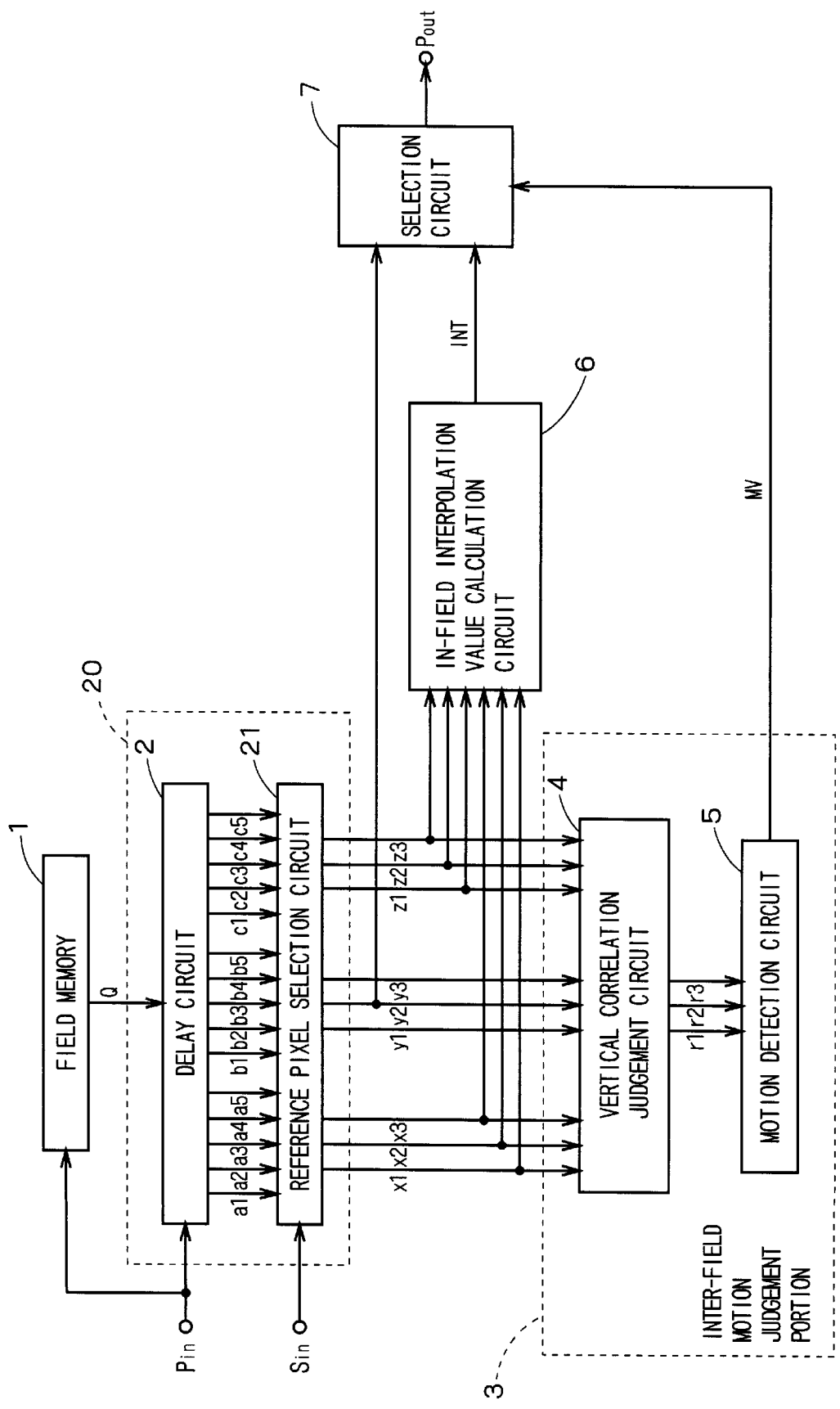
FIG. 12 shows the construction of the scanning line interpolation device according to a third preferred embodiment of the present invention.

FIG. 12 shows the scanning line interpolation device according to a third preferred embodiment of the present invention. Like reference characters are used in FIG. 12 to designate parts identical with or corresponding to those of FIG. 1. The reference numeral 20 designates a reference pixel extraction portion; 21 designates a reference pixel selection circuit; the reference character Sin designates a selection signal for the reference pixel selection circuit 21; a1, a2, a3, a4, a5, b1, b2, b3, b4, b5, c1, c2, c3, c4 and c5 designate delay pixel data delayed by predetermined time intervals in the delay circuit 2; and x1, x2, x3, y1, y2, y3, z1, z2 and z3 designate reference pixel data required for the interpolation.

Figure 13:
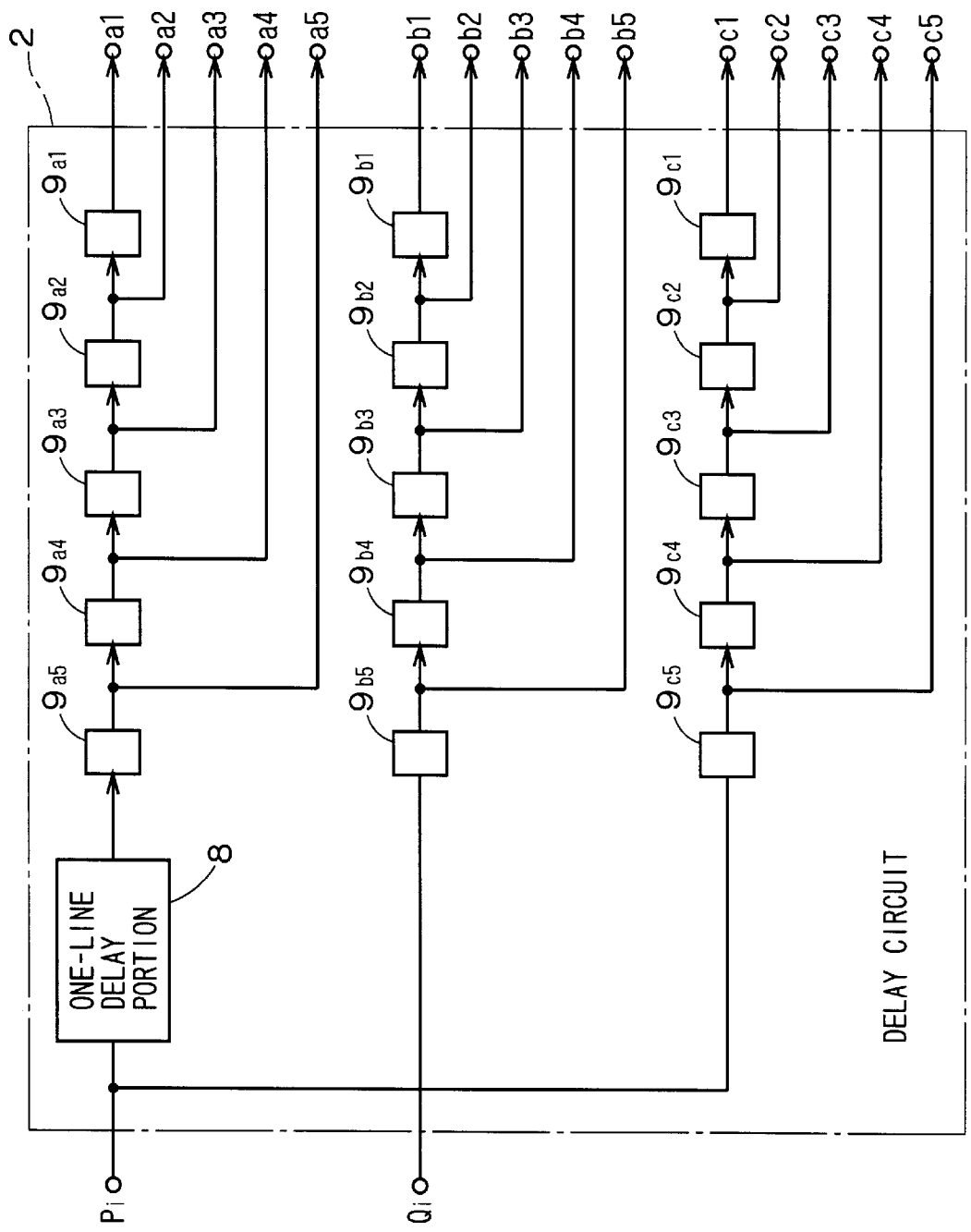
FIG. 13 shows an arrangement of a delay circuit shown in FIG. 12.

FIG. 13 shows a detailed arrangement of the delay circuit 2. In FIG. 13, the reference numeral 8 designates a one-line delay portion; and the reference characters 9a1 to 9a5, 9b1 to 9b5, and 9c1 to 9c5 designate registers.

Figure 14:
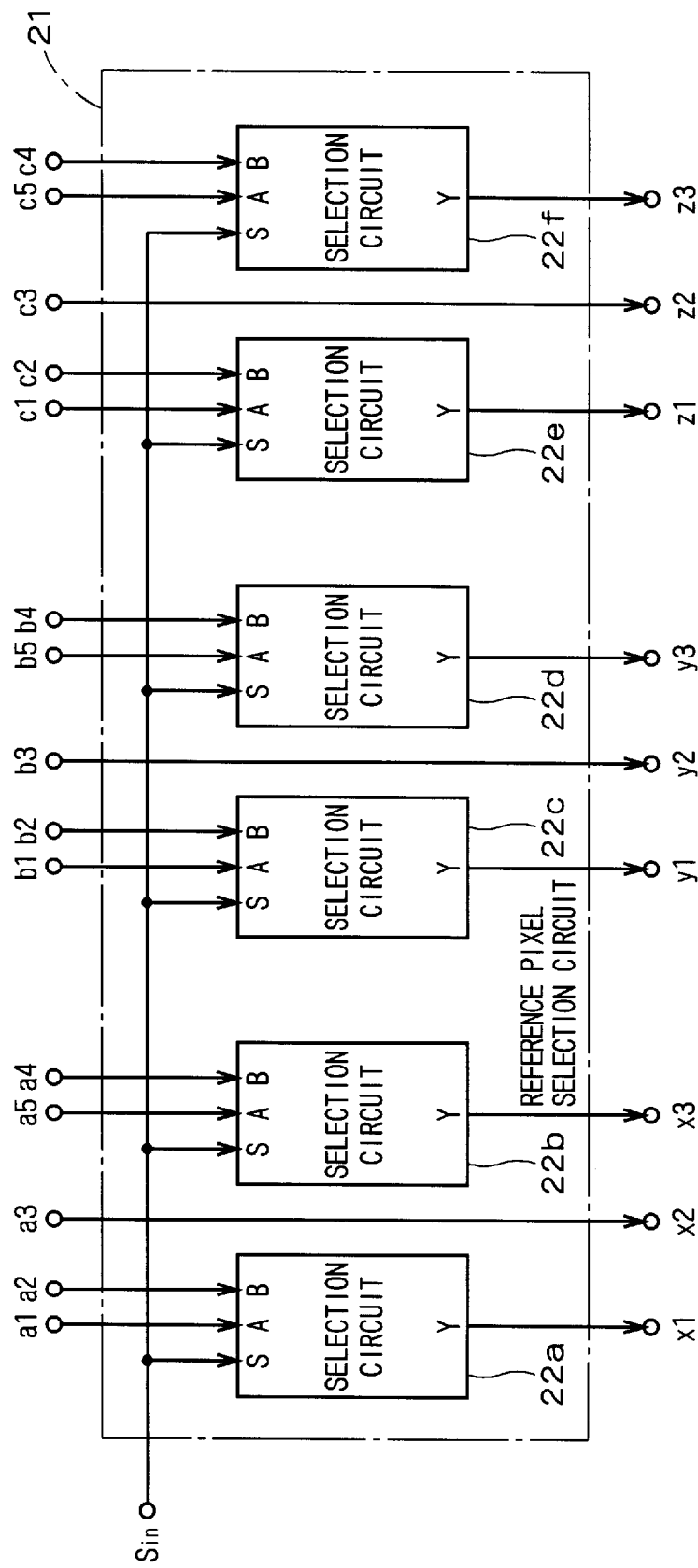
FIG. 14 shows an arrangement of a reference pixel selection circuit shown in FIG. 12.

FIG. 14 shows an arrangement of the reference pixel selection circuit 21. In FIG. 14, the reference characters 22a to 22f designate selection circuits.

In operation, the quantized two-dimensional image data Pin is inputted to the field memory 1 and the delay circuit 2. The field image data Pin inputted to the field memory 1 is delayed by a one-field time interval and then inputted to the delay circuit 2 as the preceding-field image data Q. The one-line delay portion 8 and registers 9a1 to 9a5, 9b1 to 9b5, and 9c1 to 9c5 shown in FIG. 13 delay the current-field image data Pin and preceding-field image data Q inputted to the delay circuit 2 by predetermined time intervals, to output 15 delay pixel data a1, a2, a3, a4, as, b1, b2, b3, b4, b5, c1, c2, c3 c4 and c5. FIG. 6 shows the relationship between the intended pixel Pout and the delay pixels. The circles of FIG. 6 denote the current-field image data, and the squares denote the preceding-field image data. The delay pixel data are inputted to the reference pixel selection circuit 21. When the input image data has a low band, the reference pixel selection circuit 21 selects the delay pixel data a1, a3, as, b1, b3, b5, c1, c3 and c5 to output these delay pixel data respectively as 9 reference pixel data x1, x2, x3, y1, y2, y3, z1, z2 and z3, in a manner described in the first and second preferred embodiments. When the input image data has a high band, the reference pixel selection circuit 21 selects the delay pixel data a2, a3, a4, b2, b3, b4, c2, c3 and c4 to output these delay pixel data respectively as the 9 reference pixel data x1, x2, x3, y1, y2, y3, z1, z2 and z3. Other operations of the third preferred embodiment are similar to those of the first preferred embodiment, and the description thereof will be omitted herein.

Thus, the scanning line interpolation device of the third preferred embodiment may select the reference pixel data required for the interpolation in response to the selection signal Sin. Therefore, the third preferred embodiment may determine the selection indication contents of the selection signal Sin based on the band of the input image data, to cause the inter-field motion judgement portion 3 to make the motion judgement with a sensitivity conforming to the band of the input image data.

While the invention has been described in detail, the foregoing description is in all aspects illustrative and not restrictive. It is understood that numerous other modifications and variations can be devised without departing from the scope of the invention.

We claim:

1. A scanning line interpolation device for converting an interlace signal into a non-interlace signal, comprising:

storage means for storing preceding-field image data;

reference pixel data extraction means for extracting a plurality of reference pixel data from current-field image data and said preceding-field image data provided from said storage means, said plurality of reference pixel data including pixel data located in an interpolation pixel position which is not present in said current-field image data and in positions surrounding said interpolation pixel position;

inter-field motion detection means for detecting whether or not there is motion of an image between a preceding field and a current field, based on said plurality of reference pixel data;

in-field interpolation data calculation means for calculating in-field interpolation data associated with said interpolation pixel position based on pixel data in said current field among said plurality of reference pixel data; and interpolation pixel selection means operative to select said in-field interpolation data when said inter-field motion detection means detects that there is motion, and to select pixel data in said preceding-field image data which is located in said interpolation pixel position when said inter-field motion detection means detects that there is no motion, thereby to output the selected data as interpolation pixel data of a pixel located in said interpolation pixel position, wherein said plurality of reference data comprise central line pixel data which are pixel data derived from said preceding-field image data and positioned on a central line on which said interpolation pixel position is present, and upper and lower line pixel data derived from said current-field image data and positioned on upper and lower lines lying above and below said central line, and wherein said inter-field motion detection means comprises:

vertical correlation data calculation means for calculating vertical correlation data indicative of a vertical line correlation which is a pixel data correlation between said upper line pixel data, said central line pixel data and said lower line pixel data; and motion detection means for detecting whether or not there is motion of the image based on said vertical correlation data.

2. The scanning line interpolation device according to claim 1, wherein said vertical correlation data calculation means calculates said vertical correlation data depending on whether or not the values of three reference pixel data arranged vertically and included respectively in said upper line data, said central line data, and said lower line data among said plurality of reference pixel data are ranked in the following order of magnitude: said upper line data, said central line data and said lower line data; or said lower line data, said central line data and said upper line data.

3. The scanning line interpolation device according to claim 1, wherein said motion detection means detects that there is no motion of the image when said vertical correction data indicates that the vertical line correlation holds, and otherwise detects that there is motion of the image.

4. The scanning line interpolation device according to claim 1, wherein said inter-field motion detection means comprises:

binarization means for weighting each of said plurality of reference pixel data to binarize each of said plurality of reference pixel data using an average value of the plurality of weighted reference pixel data as a threshold value; and motion detection means for comparing the plurality of binarized reference pixel data with a predetermined binary data pattern to detect motion of the image based on a result of the comparison.

5. The scanning line interpolation device according to claim 4, wherein said binarization means assigns a greater weight to said preceding-field pixel data than to said current-field pixel data among said plurality of reference pixel data.

6. The scanning line interpolation device according to claim 1, wherein said plurality of reference pixel data includes a first number of reference pixel data, and wherein said reference pixel data extraction means comprises:

reference pixel data preliminary extraction means for preliminarily extracting a second number of reference pixel data from said current-field image data and said preceding-field image data provided from said storage means, said second number being greater than said first number of the pixel data located in said interpolation pixel position and in said positions surrounding said interpolation pixel position; and reference pixel data selection means for selecting said first number of reference pixel data to be actually extracted from said second number of reference pixel data.

7. The scanning line interpolation device according to claim 6, wherein said reference pixel data selection means receives an external selection signal to select said first number of reference pixel data based on said selection signal.

8. A scanning line interpolation device for converting an interlace signal into a non-interlace signal, comprising:

a field memory storing preceding-field image data;

an inter-field motion judgement portion detecting whether or not there is image motion between a preceding field and a current field based on reference pixel data, said reference pixel data including pixel data for an interpolation pixel position which is not present in said current-field image data and pixel data for pixel positions surrounding said interpolation pixel position;

an in-field interpolation value calculation circuit calculating in-field interpolation data associated with said interpolation pixel position based on pixel data in said current field among said reference pixel data; and a selection circuit selecting said in-field interpolation data when said inter-field motion judgement portion detects image motion, and selecting pixel data in said preceding-field image data corresponding to said interpolation pixel position when said inter-field motion judgement portion detects that there is no image motion, said selection circuit outputting the selected data as interpolation pixel data for a pixel located in said interpolation pixel position, wherein said reference pixel data includes central line pixel data derived from said preceding-field image data and corresponding to pixel positions on a central line on which said interpolation pixel position is located, and upper and lower line pixel data derived from said current-field image data and corresponding to pixel positions on upper and lower lines, respectively above and below said central line; and said inter-field motion judgement portion comprises:

a vertical correlation judgement circuit calculating vertical correlation data indicative of pixel data correlation between said upper line pixel data, said central line pixel data, and said lower line pixel data; and a motion detection circuit detecting whether or not there is image motion based on said vertical correlation data.

9. The scanning line interpolation device according to claim 8, wherein said vertical correlation judgement circuit calculates said vertical correlation data by determining whether or not three reference pixel data values, A, B, and C, arranged vertically and included respectively in said upper line data, said central line data, and said lower line data satisfy: A≧B≧C or C≧B≧A.

10. The scanning line interpolation device according to claim 8, wherein said motion detection circuit determines that there is no image motion when said vertical correlation data indicates that vertical line correlation exists, and determines that there is image motion otherwise.

11. The scanning line interpolation device according to claim 8, wherein said inter-field motion judgement portion comprises:
a binarization circuit binarizing said reference pixel data using an average value of weighted reference pixel data as a threshold value.

12. The scanning line interpolation device according to claim 11, wherein said inter-field motion judgement portion further comprises:
a still picture pattern judgement circuit comparing binarized reference pixel data with a predetermined binary data pattern to detect image motion based on a comparison result.

13. The scanning line interpolation device according to claim 11, wherein said binarization circuit utilizes a threshold value based on a greater weight for preceding-field pixel data relative to a weight for current-field pixel data.

14. The scanning line interpolation device according to claim 8, wherein said reference pixel data includes a first number of reference pixel data values, and said scanning line interpolation device further comprises:
a reference pixel extraction portion extracting said reference pixel data and comprising:
a delay circuit preliminarily extracting a second number of reference pixel data values from said current-field image data and said preceding-field image data stored by said field memory, said second number being greater than said first number; and
a reference pixel selection circuit selecting said first number of reference pixel data values from said second number of reference pixel data values.

15. The scanning line interpolation device according to claim 14, wherein said reference pixel selection circuit receives an external selection signal and selects said first number of reference pixel data values based on said selection signal.

* * * * *

UNITED STATES PATENT AND TRADEMARK OFFICE
CERTIFICATE OF CORRECTION

PATENT NO. : 6,288,745 B1  
DATED : September 11, 2001  
INVENTOR(S) : Yoshiaki Okuno et al.

Page 1 of 1

It is certified that error appears in the above-identified patent and that said Letters Patent is hereby corrected as shown below:

<u>Title page, Item 54 and column 1, line 1,</u>  
Item [54] the word "SCANNER" should be replaced with the word -- SCANNING --.  
The corrected title should read: -- SCANNING LINE INTERPOLATION DEVICE--  
Item [30] Foreign Application Priority Data," please remove the reference to "April 24, 1997, JP 9-105732," as priority was not claimed.

Signed and Sealed this

Fourteenth Day of May, 2002

Attest:

JAMES E. ROGAN  
*Attesting Officer*  *Director of the United States Patent and Trademark Office*